United States Patent
Tegeltija

(10) Patent No.: US 10,240,669 B2
(45) Date of Patent: Mar. 26, 2019

(54) GEARING HAVING A FIRST AND A SECOND HOUSING PART

(71) Applicant: SEW-EURODRIVE GMBH & CO. KG, Bruchsal (DE)

(72) Inventor: Miki Tegeltija, Karlsdorf-Neuthardt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 299 days.

(21) Appl. No.: 14/906,127

(22) PCT Filed: Jun. 10, 2014

(86) PCT No.: PCT/EP2014/001571
§ 371 (c)(1),
(2) Date: Jan. 19, 2016

(87) PCT Pub. No.: WO2015/007359
PCT Pub. Date: Jan. 22, 2015

(65) Prior Publication Data
US 2016/0160990 A1    Jun. 9, 2016

(30) Foreign Application Priority Data
Jul. 16, 2013   (DE) .................. 10 2013 011 816

(51) Int. Cl.
*F16H 57/021* (2012.01)
*F16C 35/077* (2006.01)
(Continued)

(52) U.S. Cl.
CPC ......... *F16H 57/021* (2013.01); *F16C 19/548* (2013.01); *F16C 35/077* (2013.01);
(Continued)

(58) Field of Classification Search
CPC ........ F16H 57/021; F16H 1/14; F16H 57/038; F16H 57/023; F16H 57/037; F16C 19/548;
(Continued)

(56) References Cited

U.S. PATENT DOCUMENTS 1,503,849 A * 8/1924 Proctor ............... F16C 19/548
384/583
1,614,992 A * 1/1927 Roberts ............... F16C 35/06
475/246
(Continued)

FOREIGN PATENT DOCUMENTS

| CN | 101675274 A | 3/2010 |
| DE | 1977305 | 1/1968 |

(Continued)

OTHER PUBLICATIONS

International Search Report, dated Sep. 1, 2014, issued in corresponding International Application No. PCT/EP2014/001571.
(Continued)

*Primary Examiner* — Zakaria Elahmadi
(74) *Attorney, Agent, or Firm* — Hunton Andrews Kuth LLP

(57) ABSTRACT

A gearing is described as having a first and a second housing part, an intermediate shaft of the gearing being supported via two bearings in a bushing accommodating the bearings, the bushing centering the first housing part with respect to the second housing part.

11 Claims, 8 Drawing Sheets

(51) Int. Cl.
   *F16C 19/54*    (2006.01)
   *F16H 1/14*    (2006.01)
   *F16H 57/038*    (2012.01)
   *F16H 57/023*    (2012.01)
(52) U.S. Cl.
   CPC ............. *F16H 1/14* (2013.01); *F16H 57/038* (2013.01); *F16C 2361/61* (2013.01); *F16H 57/023* (2013.01)
(58) Field of Classification Search
   CPC ...... F16C 35/077; F16C 35/04; F16C 35/067; F16C 19/364; F16C 2361/61
   See application file for complete search history.

(56)             References Cited

U.S. PATENT DOCUMENTS

| 1,989,007 | A | 1/1935 | Gorton |
| 3,774,477 | A | 11/1973 | Murphy |
| 6,293,704 | B1 * | 9/2001 | Gradu .................. F16C 19/386 384/557 |
| 6,386,764 | B1 * | 5/2002 | Moore .................. F16C 41/04 384/448 |
| 7,318,759 | B2 * | 1/2008 | Bristol .................. F16C 25/08 384/500 |
| 2006/0133709 | A1 * | 6/2006 | Nied .................... F16C 19/548 384/557 |
| 2007/0025655 | A1 * | 2/2007 | Barraud ................. F16C 13/00 384/546 |
| 2008/0219607 | A1 * | 9/2008 | Murao ............... B29C 45/0046 384/417 |
| 2009/0191995 | A1 * | 7/2009 | Hamada .................. F16H 7/12 474/94 |
| 2010/0184548 | A1 * | 7/2010 | Langlois ............. B29C 45/0025 474/190 |
| 2011/0147332 | A1 * | 6/2011 | Breyer .................. B65G 9/002 212/346 |
| 2012/0308298 | A1 * | 12/2012 | Albrecht .................. F16H 1/16 403/269 |
| 2013/0068921 | A1 * | 3/2013 | Ikeda ..................... F16C 35/04 248/635 |
| 2014/0155210 | A1 * | 6/2014 | Ichikawa ................ F16H 55/48 474/174 |
| 2015/0053035 | A1 * | 2/2015 | Tegeltija ............... F16H 57/021 74/423 |

FOREIGN PATENT DOCUMENTS

| DE | 35 22 600 A1 | 1/1987 |
| DE | 3707176 | 11/1988 |
| DE | 103 31 348 | 6/2004 |
| DE | 102007061540 A1 * | 12/2007 ............. F16C 35/06 |
| DE | 10 2007 061 540 | 6/2009 |
| DE | 10 2010 043 595 A1 | 5/2012 |
| DE | 10 2012 006 790 | 10/2013 |
| WO | 2005/111443 | 11/2005 |

OTHER PUBLICATIONS

International Preliminary Report on Patentability, dated Feb. 3, 2016, issued in PCT/EP2014/001571.

* cited by examiner

GEARING HAVING A FIRST AND A SECOND HOUSING PART

FIELD OF THE INVENTION

The present invention relates to a gearing having a first and a second housing part.

BACKGROUND INFORMATION

It is common knowledge that intermediate shafts of gearings are supported via bearings in the gearing housing.

SUMMARY

Therefore, the present invention is based on the objective of further developing gearings, the manufacture of which is to be uncomplicated.

Features in the gearing of the present invention pertaining to first and second housing parts are that an intermediate shaft of the gearing is supported via two bearings in a bushing that accommodates the bearings, the bushing centering the first housing part with respect to the second housing part.

This has the advantage that the bearings together with the intermediate shaft are installable in the bushing and the entire unit assembled in this manner is then able to be inserted into and press-fit in the first housing part. The second housing part is then placed on top of the bushing that is partially protruding from the first housing part. This makes it possible to center the two housing parts relative to each other and it simplifies the assembly at the same time. The housing parts are able to be produced in an uncomplicated manner as die-casting products.

The bushing is manufacturable as a die-cast part, in particular when made from metal, or as an injection-molded part, in particular when made from plastic.

A faulty installation is easily preventable because of the symmetrical design of the bushing. The plane of symmetry includes the center of gravity of the bushing, and the axis direction of the intermediate shaft is the direction of the surface normal in relation to the plane of symmetry.

According to the present invention, the bushing has an inner sleeve section, which accommodates a first bearing of the intermediate shaft in a first axial section, and a second bearing of the intermediate shaft in a second axial section, a web section being axially situated between the first and second section, whose smallest radial clearance is smaller than the smallest radial clearance of the first or second section, the inner and the outer sleeve section being connected via support ribs, the support ribs being set apart from each other in the circumferential direction, a first one of the support ribs being developed axially shorter and/or shorter in the circumferential direction than a second one of the support ribs. This has the advantage that lower contact pressure forces are required when inserting the bearings into the bushing, and the bearings are thereby exposed to lower stresses during the assembly. In addition, a less expensive production is possible, in particular as a die-cast part.

In one advantageous development, the first support ribs are axially shorter and/or shorter in the circumferential direction than second support ribs, first and second support ribs being situated in alternation one behind the other in the circumferential direction, or a second support rib being situated in front of and behind a group of first support ribs in the circumferential direction in each case. This has the advantage of allowing an uncomplicated production, and the bearings are able to be inserted into their receptacle in the bushing without great force.

In one advantageous development, one or more of the support rib(s), in particular the second support ribs, have a contact pressure surface for a tool for axially pushing them out of a die-cast mold. This has the advantage of allowing an uncomplicated production, and the bushings can easily be pushed out of the casting mold without damaging the bushing. The contact pressure surfaces are preferably planar for this reason, the direction of the surface normal of the plane being aligned in parallel with the axial direction of the bushing in each case.

In one advantageous development, the first support ribs are set apart from each other at regular intervals, and the second support ribs are set apart from each other at regular intervals. This has the advantage of providing a regular, periodically varying stability in the circumferential direction, so that the bearing is able to be loaded uniformly.

In one advantageous development, the first and second housing parts are connected to each other by screws, the screw connection being placed outside the bushing. A firm connection is advantageously able to be created in this manner.

In one advantageous development, the bushing has an outer sleeve section, which is resting against the receiving regions of the two housing parts. This is advantageous insofar as a load-bearing structure is obtained which uses little material, and openings for the passage of oil are provided in addition.

In one advantageous development, the outer sleeve section has a first axial section, which is developed as an insertion fitting region, and a second axial section, which is developed as a press-fit region, the axial direction corresponding to the intermediate shaft axis. This has the advantage that the insertion into the housing parts is facilitated and the press-fit region has bearing strength, in particular through thermal shrink-fitting. An adhesive agent is provided in addition.

In one advantageous development, the bushing has an inner sleeve section, which accommodates a first bearing of the intermediate shaft in a first axial section and a second bearing of the intermediate shaft in a second axial section, a web section being axially situated between the first and second sections, whose smallest radial clearance is smaller than the smallest radial clearance of the first or second section. This has the advantage of producing a structure that has bearing strength and has axially continuous openings.

In one advantageous development, the inner and the outer sleeve sections are connected via support ribs, the support ribs being spaced apart from each other in the circumferential direction, in particular at regular intervals. This has the advantage of providing axially continuous openings for the passage of oil and thus for lubricating the tooth constructions and bearings disposed along both sides of the bushing.

In one advantageous development, the bearings are tapered roller bearings, in particular in an O-arrangement, X-arrangement or a tandem arrangement. It is advantageous in this regard that bearing systems that are easy to produce can be used.

In one advantageous development, the intermediate shaft is connected to a first toothed part in a manner that prevents rotation or it has a corresponding toothed construction, so that a first axial bearing is axially delimited by the toothed part or the toothed construction section, a further toothed part being connected to the intermediate shaft in a torsionally fixed manner on the axial side of the bushing facing away therefrom, which axially delimits the other bearing, the further toothed part in particular being axially delimited by a securing ring. This has the advantage that the positioning of the bearings can be obtained in an uncomplicated manner.

In one advantageous development, the intermediate shaft is provided with a bevel pinion toothing or is connected thereto in a torsionally fixed manner, and/or the intermediate shaft is provided with or connected to a helically-cut spur gear. This advantageously makes it possible to produce the intermediate shaft in an uncomplicated manner.

In one advantageous development, the bevel pinion toothing is in engagement with a bevel gear supported in the second housing part via bearings accommodated there. This is advantageous insofar as the bushing advantageously allows a simple design of a bevel gear.

In one advantageous development, the first housing part is connected to a motor housing, and a rotor shaft is supported via bearings accommodated inside the motor housing, the rotor shaft being connected to an inputting toothed part of the gearing in a torsionally fixed manner, the first inputting toothed part being radially surrounded by the first housing part. This has the advantage that the inputting toothed part is disposed in the gearing and supported via the motor.

In one advantageous development, the toothed part, which is connected to the intermediate shaft in a torsionally fixed manner, is in engagement with the inputting toothed part connected to the rotor shaft. This is advantageous insofar as the inputting toothed part is supportable via the electric motor.

In one advantageous development, the bushing is press-fit in a receiving region of the first housing part and in a receiving region of the second housing part disposed coaxially thereto. This offers the advantage that centering is able to be carried out with the aid of the bushing.

In one advantageous embodiment, the first and second housing parts are sealingly connected, which offers the advantage that oil can be used in the gearing interior.

In one advantageous development, an annular space region for holding a bonding agent is situated between one of the housing parts and the bushing, the space region in particular being delimited by a depression in the bushing and the receiving region of the housing part for the bushing. This has the advantage that the bonding connection makes it possible to prevent the bushing from rotating in relation to the housing, although the bushing is rotatable during the assembly before the bonding agent cures, so that the setting of the bearings is able to be facilitated.

Further advantages are derived from the dependent claims. The present invention is not restricted to the feature combination of the claims. A person skilled in the art will discover additional meaningful possibilities for combining claims and/or individual claim features and/or features of the specification and/or of the figures, that arise in particular from the stated objective and/or the objective resulting from a comparison with the related art.

DETAILED DESCRIPTION

Figure 1:
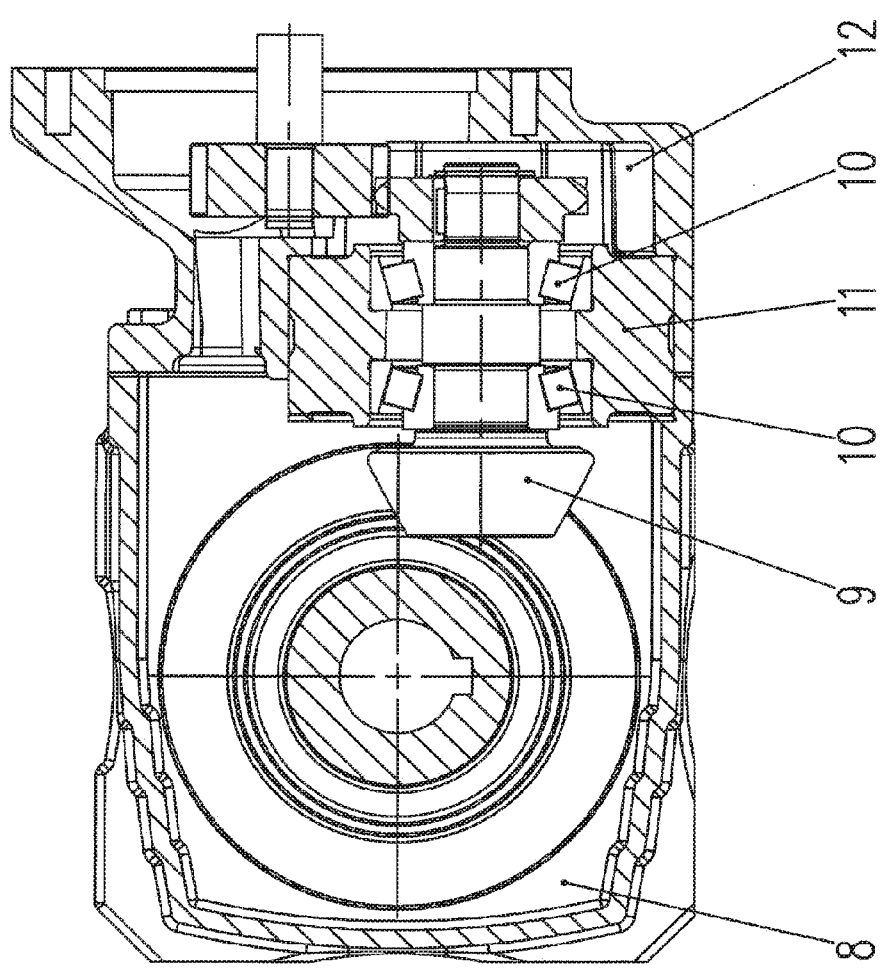
FIG. 1 shows a sectional view through a gearing of the present invention including a bushing 11.
Figure 2:
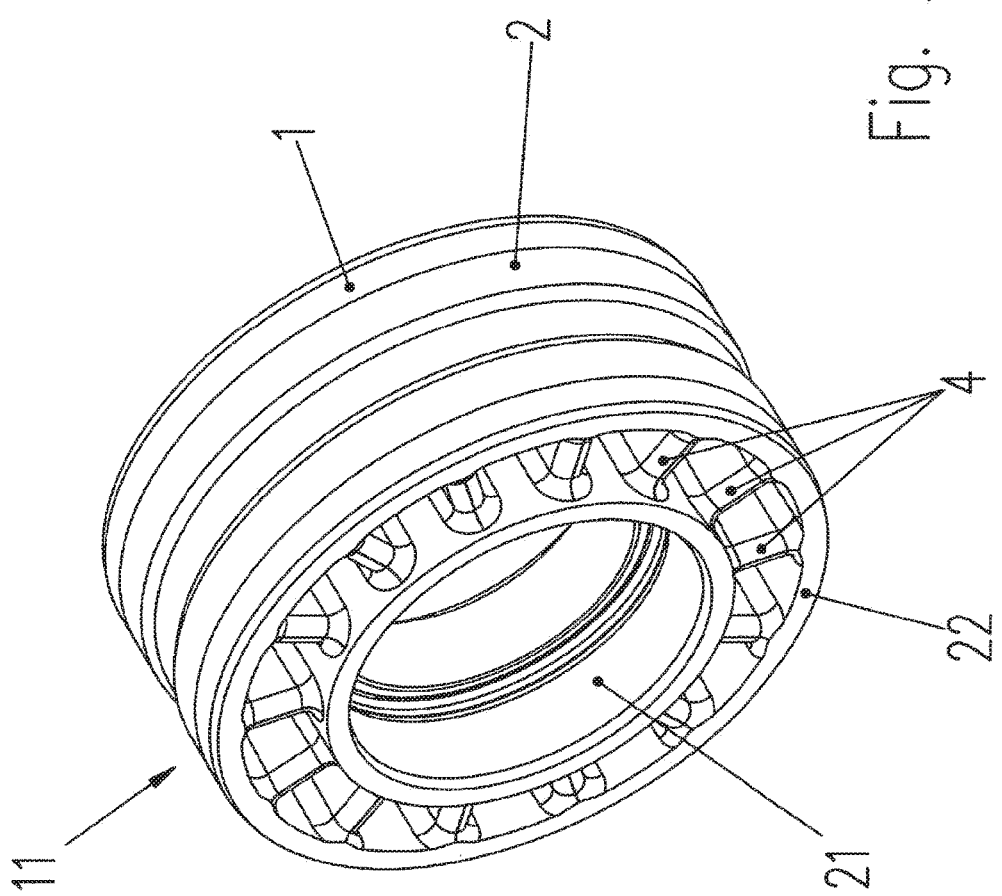
FIG. 2 shows bushing 11 in an oblique view.
Figure 3:
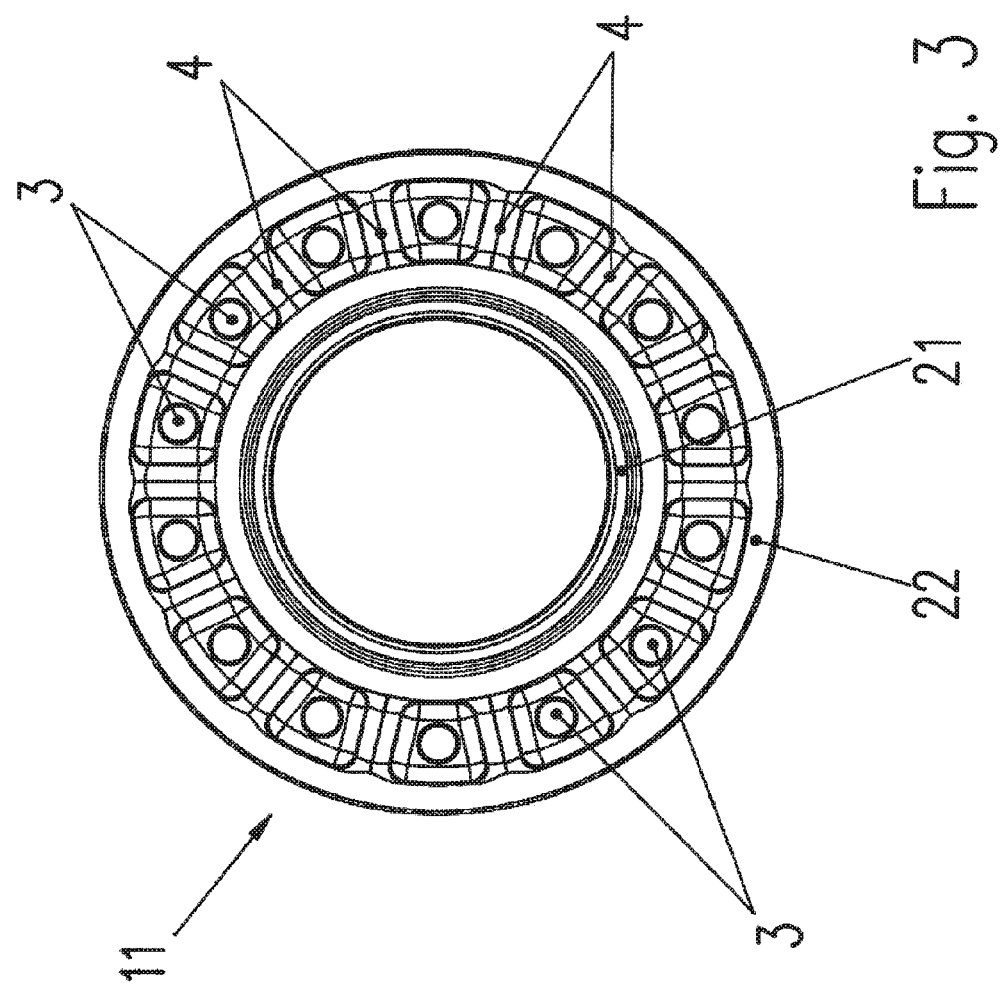
FIG. 3 shows bushing 11 in a plan view.
Figure 4:
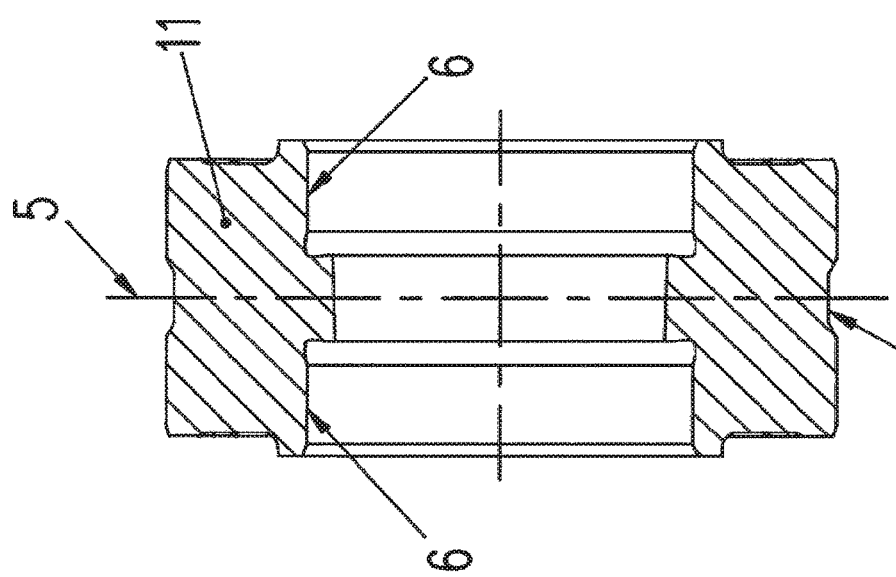
FIG. 4 shows bushing 11 in a sectional view.

The housing of the gearing has at least two housing parts (12, 14), which are centered with respect to each other with the aid of bushing 11.

Bushing 11 accommodates two bearings (8, 10), via which an intermediate shaft 18 is supported, which is connected at its axial end region on the input side to a toothed wheel 20 in a torsionally fixed manner, which is in engagement with an inputting toothed wheel 16 that is connected in a torsionally fixed manner to an inputting shaft 17, in particular a rotor of a driving electric motor (not shown). Toothed wheel 16 together with shaft 17 is supported in the housing of the driving device, in particular the electric motor. The housing of the driving device is connected to first housing part 12, and a centering means, in particular a centering collar, is developed here on first housing part 12.

At its other axial end region, intermediate shaft 18 is connected to bevel pinion 9 in a manner that prevents rotation. As an alternative, intermediate shaft 18 is developed in one piece with bevel pinion 9, so that the toothing construction of the bevel pinion is incorporated in a shaft section of intermediate shaft 18.

Bevel pinion 9 is in engagement with bevel gear 13, which is supported via bearings in second housing part 14 or in a housing part that is connected to second housing part 14.

The inner ring of first bearing 10 of bushing 11 lies at a shaft step, in particular a shaft collar, of intermediate shaft 18.

The outer ring of first bearing 10 is resting against an inner step of the inner wall of bushing 11.

The outer ring of second bearing 8 is likewise resting against an inner step of the inner wall of bushing 11. The two mentioned inner steps are formed by an annular section that extends radially inwardly and is situated on the inner wall of bushing 11, the annular section being radially set apart from intermediate shaft 18.

The inner ring of second bearing 8 lies against toothed wheel 20, which axially is secured by a securing ring 19 disposed on a side of toothed wheel 20 facing away from bearing 8.

As a result, the bearings (8, 10) are able to be developed as tapered roller bearings, for example, and kept axially delimited.

In a two-piece development of bevel pinion 9 and intermediate shaft 18, an axial limiting means is disposed between bevel pinion 9 and intermediate shaft 18.

At its outer side, bushing 11 has a depression 7 and is accommodated in the cylindrical, preferably stepless receiving regions of the housing parts (12, 14). The receiving regions are preferably produced as bore holes.

Depression 7 thus delimits an annular space region, into which a bonding agent is able to be introduced, via the wall of the receiving region of first housing part 12. As a result, the bonding agent then provides a rotationally fixed connection between first housing part 12 and bushing 11.

In addition, on its outer surface, i.e., on the outer surface of outer sleeve section 22, bushing 11 has a first axial section, which is developed as insertion fitting region 1 and facilitates the introduction of bushing 11 into the receiving region; it also has an adjoining axial section, which acts as press-fit region 2, so that high static friction is created.

The receiving region of housing part 12 is preferably thermally shrunk onto the bushing in addition. To do so, a temperature difference is provided between bushing and housing part 12 during the joining operation.

In the same way, the bushing has an insertion guide region and a press-fit region as well, which become effective during the joining to second housing part 14.

Bushing 11 has an inner sleeve section 21 and an outer sleeve section 22, inner sleeve section 21 accommodating the individual outer rings of the bearings (8, 10) and outer sleeve section 22 touching the receiving regions of the housing parts (12, 14).

Situated in the radial clearance region between the two sleeve sections (21, 22) are radially extending support ribs 4 developed in the form of spokes, so that an axially continuous opening 3 is present between two support ribs situated next to each other in each case in the circumferential direction. This allows oil to be routed from the axially front to the axially rear side of bushing 11.

Support ribs 4, outer sleeve section 22, and inner sleeve section 21 are preferably developed in one piece.

Bushing 11 is preferably made of steel or a metal such as aluminum.

In one further exemplary embodiment according to the present invention, other bearings such as roller ball bearings are used instead of the illustrated tapered roller bearings (8, 10) situated in an O-system or a tandem system.

Figure 5:
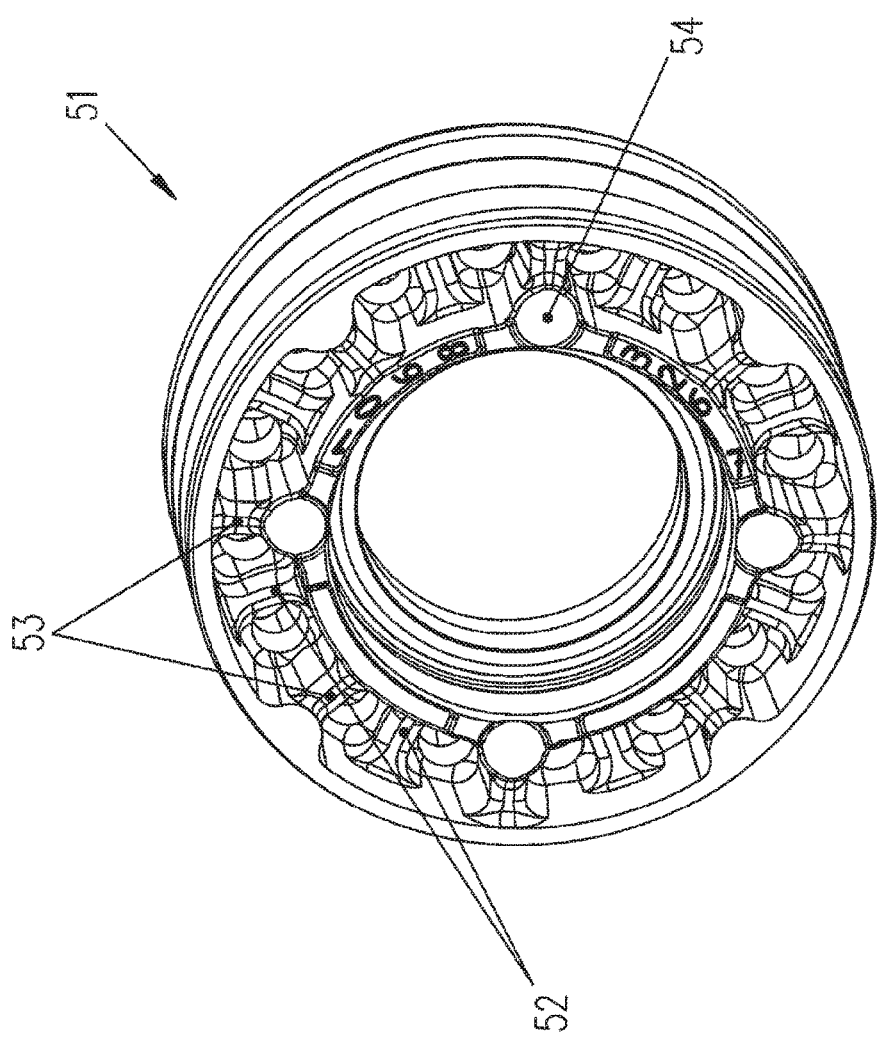
FIG. 5 shows another bushing 51, which is used instead of bushing 11, the support ribs differing in this case.

As illustrated in FIG. 5, it is also possible to use a bushing 51 instead of bushing 11, which has different support ribs. An axially shorter support rib 52 and an axially longer support rib 53 are shown in alternation in the circumferential direction.

This allows an uncomplicated production of bushing 51. Also situated on bushing 51 are contact pressure surface 54 for a tool for expelling bushing 51 during the production by die-casting.

Because of the support ribs (52, 53) having different axial lengths, a bearing that is inserted, especially fitted, into the bearing seat of bushing 51 is connected in a force-locking and satisfactory manner. For the axially shorter support ribs 52 reduce the stability in the axial end region, so that an elastically more deformable region is created there in comparison with the axial end region of support ribs 53. Varying elasticity of the bearing seat consequently exists in the circumferential direction, so that when the bearing is slipped into the bearing seat in the axial direction, less force has to be applied than in the development according to FIGS. 1 through 4.

Figure 6:
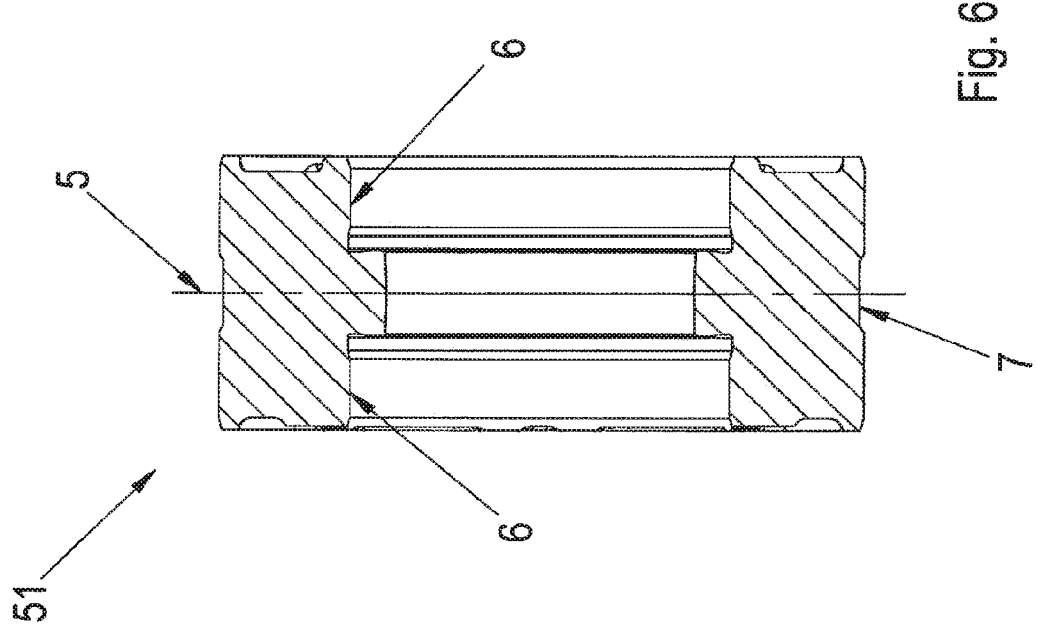
FIG. 6 shows a cross-section associated with bushing 51.

As illustrated in FIG. 6, the bearing seats terminate axially in the same manner as the outer circumference of bushing 51. As a result, the axial length of bushing 51 corresponds exactly to the axial length defined by the receiving regions in housing parts 12 and 14.

Figure 7:
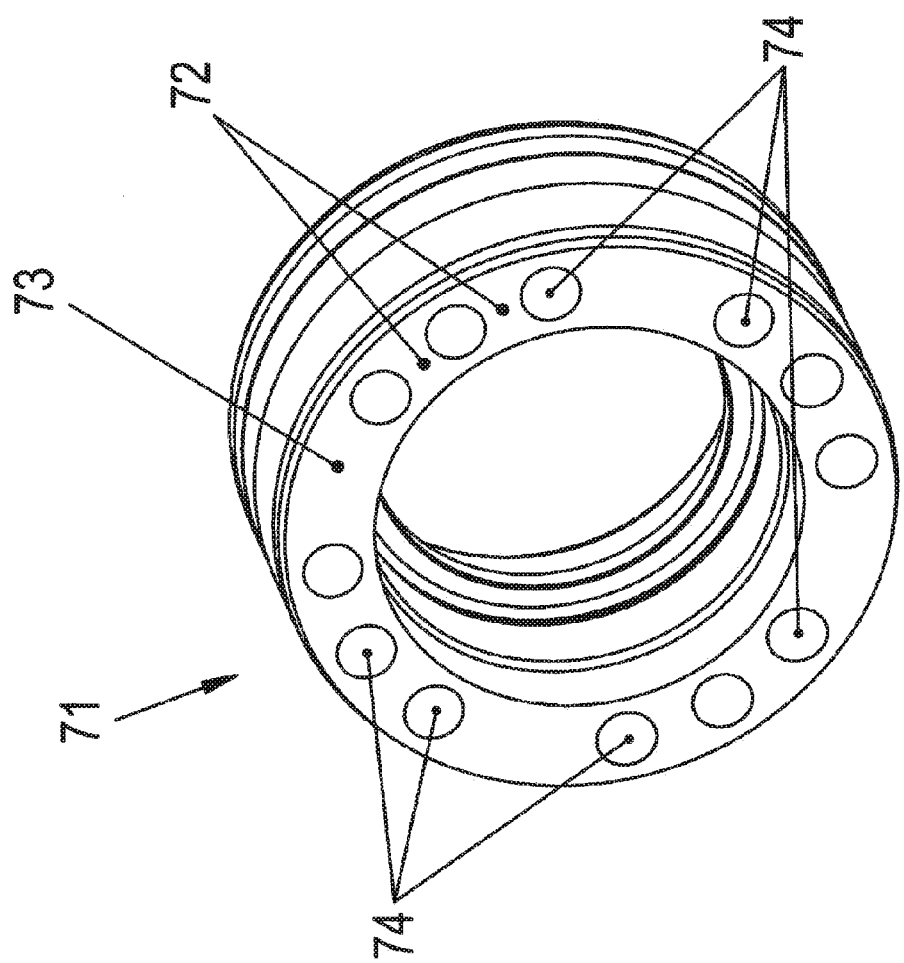
FIG. 7 shows a further bushing 71, which is used instead of bushing 11 and easy to produce.
Figure 8:
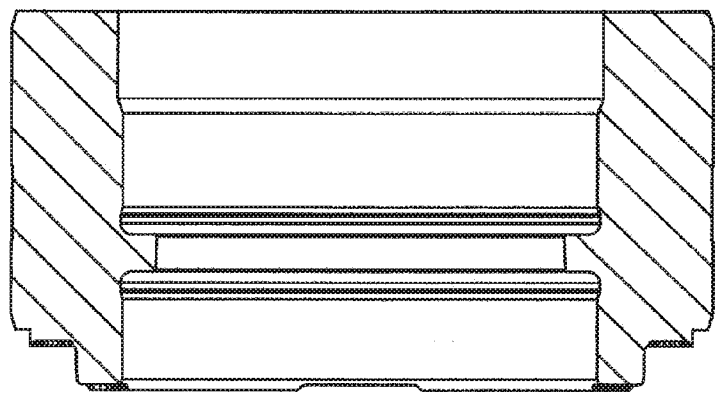
FIG. 8 shows bushing 71 in cross-section, in which the bearing seats are no longer axially symmetrical.

In the same way, different support ribs are used in bushing 71 according to FIG. 7, which once again may be used instead of bushing 11, so that here, too, the bearing is exposed to lower forces when inserted into the bearing seat.

For this purpose first support ribs 72, which are shorter in the circumferential direction, are followed by support ribs 73 in the circumferential direction, which are longer in the circumferential direction.

Support ribs 73, which are longer in the circumferential direction, may also be used as available contact pressure surfaces 54 for a tool at bushing 51 during the die-casting production. The support ribs (72, 73) are thus able to be developed at the same axial length. The support ribs (72, 73) that follow each other in the circumferential direction are able to be delimited by an individual recess that is interposed in the circumferential direction in each case. The recesses can be produced as individual bore holes 74.

The bearing seats of bushing 71 no longer have the same axial length.

LIST OF REFERENCE NUMERALS

1 Insertion guide area
2 Press-fit area
3 Recess, through hole for oil exchange
4 Support rib
5 Line of symmetry
6 Bearing seat
7 Depression for forming a space for a bonded connection to prevent rotation
8 Bearing
9 Bevel pinion
10 Bearing
11 Bushing
12 First housing part
13 Bevel gear
14 Second housing part
16 Toothed wheel
17 Shaft, in particular inputting shaft, in particular rotor of an electric motor
18 Intermediate shaft
19 Securing ring
20 Toothed wheel
21 Inner sleeve section
22 Outer sleeve section
51 Bushing
52 Axially shorter support ribs
53 Axially longer support ribs
54 Contact pressure area for tool
71 Bushing
72 Shorter support ribs in the circumferential direction
73 Longer support ribs in the circumferential direction
74 bore hole

The invention claimed is:
1. A gearing, comprising:
a first housing part;
a second housing part;
a bushing having an inner sleeve section and an outer sleeve section;
a plurality of bearings accommodated in the bushing;
an intermediate shaft supported via the bearings, wherein:
the bushing centers the first housing part with respect to the second housing part,
the inner sleeve section accommodates a first of the bearings of the intermediate shaft in a first axial section and a second of the bearings of the intermediate shaft in a second axial section;
a web section disposed axially between the first and second axial sections, wherein a smallest radial clearance of the web section is smaller than a smallest radial clearance of the first or second axial section sections; and
support ribs via which the inner and the outer sleeve sections are connected, the support ribs being set apart from each other in a circumferential direction, a first one of the support ribs being at least one of axially shorter and shorter in the circumferential direction than a second one of the support ribs.

2. A gearing, comprising:
a first housing part;
a second housing part;
a bushing having an inner sleeve section and an outer sleeve section;
a plurality of bearings accommodated in the bushing;
an intermediate shaft supported via the bearings, wherein:
the bushing centers the first housing part with respect to the second housing part,
the inner sleeve section accommodates a first of the bearings of the intermediate shaft in a first axial section and a second of the bearings of the intermediate shaft in a second axial section;
a web section disposed axially between the first and second axial sections, wherein a smallest radial clearance of the web section is smaller than a smallest radial clearance of the first or second axial section sections; and
support ribs via which the inner and the outer sleeve sections are connected, the support ribs being set apart from each other in a circumferential direction, a first one of the support ribs being at least one of axially shorter and shorter in the circumferential direction than a second one of the support ribs;
wherein one of:
the support ribs include first support ribs and second support ribs, the first support ribs being at least one of axially shorter and shorter in the circumferential direction than second support ribs, individual ones of the first support ribs being situated in alternation one behind the other in the circumferential direction, and individual ones of the second support ribs being situated in front of and behind a group of the first support ribs in the circumferential direction in each case.

3. The gearing as recited in claim 2, wherein at least one of the second support ribs includes a contact pressure surface for a tool for axially pushing the second ribs out of a die-cast mold.

4. The gearing as recited in claim 2, wherein the first support ribs are set apart from each other at first regular intervals, and the second support ribs are set apart from each other at second regular intervals.

5. The gearing as recited in claim 1, further comprising:
screws for forming a screw connection that connects the first and the second housing parts to each other, the screw connection being situated outside the bushing.

6. The gearing as recited in claim 1, wherein the outer sleeve section of the bushing rests against receiving regions of the first and second housing parts.

7. The gearing as recited in claim 1, wherein:
the outer sleeve section of the bushing includes a first axial section that is developed as an insertion guide region,
the outer sleeve section of the bushing includes a second axial section that is developed as a press-fit region, and
an axial direction corresponds to an intermediate shaft axis.

8. The gearing as recited in claim 1, wherein the bearings include tapered roller bearings.

9. The gearing as recited in claim 8, wherein the tapered roller bearings are in one of an O-arrangement, an X-arrangement, and a tandem arrangement.

10. The gearing as recited in claim 1, wherein the intermediate shaft is connected to a first toothed part in a manner that prevents rotation or it has a corresponding toothing region, so that a first axial bearing is axially delimited by the toothed part or toothing section, and wherein a further toothed part is connected to the intermediate shaft in a torsionally fixed manner on the axial side of the bushing facing away therefrom, which axially delimits the other bearing, the further toothed part being axially delimited by a securing ring.

11. A gearing, comprising:
a first housing part;
a second housing part;
a bushing having an inner sleeve section and an outer sleeve section;
a plurality of bearings accommodated in the bushing;
an intermediate shaft supported via the bearings, wherein:
the bushing centers the first housing part with respect to the second housing part,
the inner sleeve section accommodates a first of the bearings of the intermediate shaft in a first axial section and a second of the bearings of the intermediate shaft in a second axial section;
a web section disposed axially between the first and second axial sections, wherein a smallest radial clearance of the web section is smaller than a smallest radial clearance of the first or second axial section sections; and
support ribs via which the inner and the outer sleeve sections are connected, the support ribs being set apart from each other in a circumferential direction, a first one of the support ribs being at least one of axially shorter and shorter in the circumferential direction than a second one of the support ribs;
wherein at least one of:
the intermediate shaft is provided with a bevel pinion toothing or connected thereto in a torsionally fixed manner, and the intermediate shaft is provided with or connected to a helically-cut spur gear,
the bevel pinion toothing is in engagement with a bevel gear supported in the second housing part via bearings accommodated there,
the first housing part is connected to a motor housing, a rotor shaft being supported via bearings accommodated in the motor housing, the rotor shaft being connected to an inputting toothed part of the gearing in a torsionally fixed manner and the inputting toothed part being radially surrounded by the first housing part,
the toothed part connected to the intermediate shaft in a torsionally fixed manner is in engagement with the inputting toothed part connected to the rotor shaft,
the bushing is press-fit into a receiving region of the first housing part and into a receiving region of the second housing part disposed coaxially thereto,
the first and the second housing parts are sealingly connected,
an annular space region for holding a bonding agent is situated between one of the housing parts and the bushing, and
the space region is delimited by a depression in the bushing and the receiving region of the housing part for the bushing.

* * * * *